(12) United States Patent
Hosomi

(10) Patent No.: US 7,489,662 B2
(45) Date of Patent: Feb. 10, 2009

(54) WIRELESS TERMINAL DEVICE

(75) Inventor: Takahiro Hosomi, Tokyo (JP)

(73) Assignee: NEC Corporation, Tokyo (JP)

( * ) Notice: Subject to any disclaimer, the term of this patent is extended or adjusted under 35 U.S.C. 154(b) by 841 days.

(21) Appl. No.: 10/798,307

(22) Filed: Mar. 12, 2004

(65) Prior Publication Data
US 2004/0179491 A1    Sep. 16, 2004

(30) Foreign Application Priority Data
Mar. 12, 2003    (JP) .............................. 2003-066725

(51) Int. Cl.
H04Q 7/00    (2006.01)
(52) U.S. Cl. ........................ 370/334; 370/332; 455/425; 375/106
(58) Field of Classification Search .................. 370/329, 370/335, 342, 334, 331, 328
See application file for complete search history.

(56) References Cited

U.S. PATENT DOCUMENTS

| 6,212,368 | B1 * | 4/2001 | Ramesh et al. ............ 455/277.2 |
| 6,771,944 | B2 * | 8/2004 | Harano ..................... 455/276.1 |
| 6,799,026 | B1 * | 9/2004 | Scherzer et al. .......... 455/279.1 |
| 6,985,473 | B2 * | 1/2006 | Vayanos et al. ............. 370/342 |
| 7,079,507 | B2 * | 7/2006 | Toskala et al. .............. 370/329 |
| 7,133,382 | B2 * | 11/2006 | Steudle ....................... 370/331 |

FOREIGN PATENT DOCUMENTS

| JP | 4-302549 A | 10/1992 |
| JP | 8-500475 | 1/1996 |
| JP | 8-265299 A | 10/1996 |
| JP | 9-69808 | 3/1997 |
| JP | 10-308703 A | 11/1998 |
| JP | 11-17656 A | 1/1999 |
| JP | 11-284576 A | 10/1999 |
| JP | 2002-57622 A | 2/2000 |
| JP | 2000-92554 | 3/2000 |
| JP | 2000-332686 A | 11/2000 |
| JP | 2002-261665 | 9/2002 |

OTHER PUBLICATIONS

Japanese Office Action dated Aug. 30, 2005 (and English translation of relevant portion).

* cited by examiner

Primary Examiner—Charles N Appiah
Assistant Examiner—Amancio Gonzalez
(74) Attorney, Agent, or Firm—Dickstein, Shapiro, LLP.

(57) ABSTRACT

A wireless terminal device having a simple configuration with at least two antennas, a single receiver, and a single reception level measuring section, which is capable of performing transmission and reception antenna diversity without a break of communication. The wireless terminal device, which communicates with a base station, comprises a reception system and a transmission system. The reception system includes a receiver, despreading section, a PN generator, and a BCH reception level measuring section. The BCH reception level measuring section measures a reception level of the broadcast channel. The transmission system includes a transmitter, a spreading section, and a PN generator. Either of two antennas is selected by a controller and an antenna switch. When a measured value of the broadcast channel via the selected antenna is equal to or less than a threshold value, the controller switches the working antenna to the other antenna, and obtains a measured value of a reception level of the other antenna during a transmission gap. Subsequently, when the first measured value is more than the second measured value, the controller switches to the antenna having a measured value higher than the other antenna to some extent.

8 Claims, 5 Drawing Sheets

F I G. 7
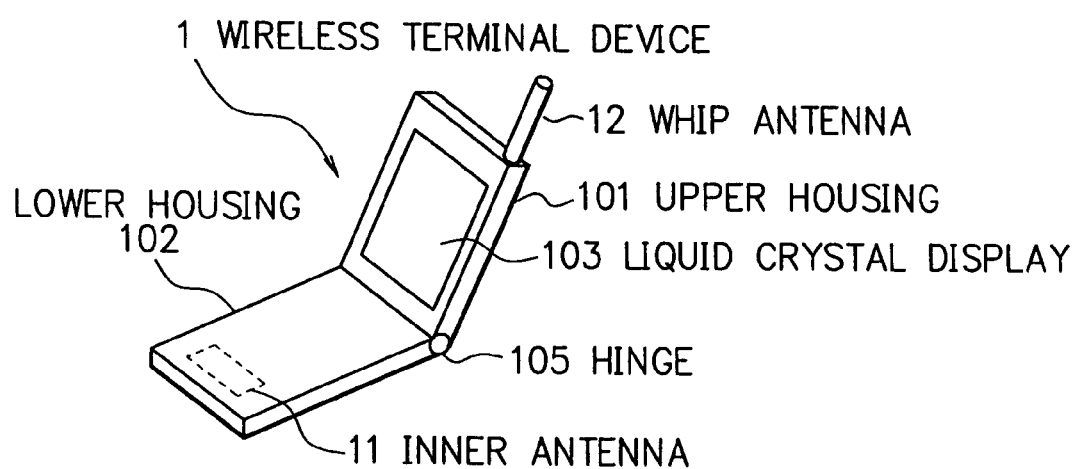

WIRELESS TERMINAL DEVICE

BACKGROUND OF THE INVENTION

The present invention broadly relates to wireless terminal devices, and in particular, to a wireless terminal device capable of performing diversity reception without a break in communication with the use of two transmitting and receiving antennas.

DESCRIPTION OF THE RELATED ART

FIG. 1 shows an external view of a conventional wireless terminal device.

As shown in FIG. 1, a wireless terminal device 100 is a flip-type mobile terminal device. The housing of the wireless terminal device 100 is composed of an upper housing 101 and a lower housing 102. The upper housing 101 is provided with a liquid crystal display 103. The lower housing 102 has an inner antenna 104. The upper housing 101 is rotatably connected to the lower housing 102 via a hinge 105. When the wireless terminal device 100 is closed (when the hinge 105 is folded up), the device 100 becomes small in size approximately by half.

When a user holds the lower housing 102 of the wireless terminal device 100 shown in FIG. 1 to browse the Internet, the inner antenna 104 is covered by the user's hand. In this state, the reception level may be unfavorably decreased to a large extent.

Therefore, there is proposed a wireless terminal device employing a method of antenna diversity for reducing the variation of the reception level of radio waves. To this end, the wireless terminal device is provided with two antennas to be switched one another.

FIG. 2 is an external view showing a wireless terminal device 200 provided with two antennas. The same reference numerals as those shown in FIG. 1 denote the same parts in FIG. 2, thereby abbreviating the explanation. As shown in FIG. 2, the wireless terminal device 200 comprises an upper housing 101 and a lower housing 102. The lower housing 102 has an inner antenna 104. The upper housing 101 has a whip antenna (or a helical antenna) 106 at one of the corners of the upper housing 101. The whip antenna 106 is an extensible antenna almost all of which is normally set in the upper housing 101.

The wireless terminal device 200 employs a communication method of antenna diversity utilizing reception outputs through the respective inner antenna 104 and the whip antenna 106. By this means, it becomes possible to prevent influence of hand when a user holes the device 200 at the lower housing 102 during communication. Further, it becomes possible to reduce multi-path fading and influence of interference waves, both of which are generated according to status of use.

FIG. 3 shows a configuration of a general antenna-diversity receiving section in a wireless terminal device employing a TDMA (Time Division Multiple Access) method.

An antenna switching section 201 is connected to antennas 202 and 203, a receiver 204 and a controller 206. Further, the receiver 204 is connected to a reception level measuring section 205 that measures a reception level. The reception level measuring section 205 is connected to the controller 206.

In the wireless terminal device 200 shown in FIG. 3, the receiving level measuring section 205 measures a reception level of either the antenna 202 or 203 that receives data in a divided slot dedicated to the mobile terminal device 200. On the other hand, the reception level measuring section 205 switches the antenna to the other antenna in the remaining slot, which is not dedicated to the wireless terminal device 200, to measure a reception level of the other antenna. Subsequently, the reception levels from the respective antennas 202 and 203 are compared. Thereafter, the controller 206 controls the antenna switching section 201 so as to select an antenna with a larger reception level in a next received slot dedicated to the wireless terminal device 200. By this means, it becomes possible to realize antenna diversity.

The configuration shown in FIG. 3 is an example when being applied to a mobile terminal device using a TDMA method. In the following, a case will be explained where this configuration is applied to a wireless terminal device using a CDMA (Code Division Multiple Access) method. In the CDMA method, a reception level during communication is always measured with reception of data. It is assumed that, an antenna that is receiving data is temporarily switched to the other antenna for comparison of the reception levels of the two antennas, and that the latter antenna (the other antenna) has a lower reception level. In this case, even when the reception of data is performed again by the former antenna after the reception level of the latter antenna is measured, the mobile terminal 200 fails in receiving data during the switching time (the time period while the reception of data is performed by the latter antenna), and the communication may be temporarily broken up. Therefore, in the CDMA method, there is no other choice but to provide the two antennas with respective receiving sections and reception level measuring sections. This configuration will be explained in reference to FIG. 4.

FIG. 4 shows a configuration of a wireless terminal device employing a CDMA method. In a wireless terminal device 300, antennas 302 and 304 are connected to receivers 301 and 303, respectively. The receivers 301 and 303 are connected to reception level measuring sections 305 and 306, respectively. A controller 307 is connected to the reception level measuring sections 305 and 306 and a reception-system switching section 308. Further, the controller 307 controls the reception level measuring sections 305 and 306. The reception-system switching section 308 switches the reception outputs between the reception level measuring sections 305 and 306.

When a wireless terminal device employs a CDMA method, the dedicated slots cannot be divided by time axis. Accordingly, the wireless terminal device with the CDMA method cannot employ the configuration shown in FIG. 3. However, the wireless terminal device 300 is provided with the two antennas 302 and 304, the two reception level measuring sections 305 and 306, and the single reception-system switching section 308. By this configuration, the wireless terminal device 300 measures the reception levels of the antennas 302 and 304 while receiving data therethrough to determine the antenna with a larger reception level for receiving data. Accordingly, the device 300 can perform antenna diversity even by employing the CDMA method.

There is proposed a configuration example of a base station for performing diversity transmission and reception with the CDMA method in Japanese Patent Application Laid-Open No. HEI 9-69808. The base station conducts despreading, synthesizing, and error correction (by an error-correcting decoding circuit) to received signals through respective two antennas to obtain received data in respective channels. Further, the error-correcting decoding circuit obtains an antenna selecting signal. The base station utilizes the antenna selecting signal and outputs from a spreading circuit for switching the antennas. By this configuration, it becomes possible to reduce interference caused by cross-correlation between channels and to realize improved communication quality and increased capacity for subscribers.

However, the conventional wireless terminal device with the configuration shown in FIG. 4 requires two receivers and receiving level measuring sections, respectively. This becomes a disadvantage in terms of the circuit size and power (current) consumption in comparison with the device with the configuration of FIG. 3 comprising a single antenna, receiver and reception level measuring section.

Moreover, there is a way to arrange an antenna according to a used application such as application for telephone call, videophone, Web browsing, etc. so as to increase the reception level on the basis of stochastic approach such as a market research on what kinds of antennas are used according to various situations. In this case, however, there are great differences between individual users, and it is impossible to steadily perform optimal control to two antennas in response to the reception levels.

Further, different from the configuration in which antennas are switched to perform reception diversity, the configuration proposed in the above-described application is such that two antennas are simultaneously used for transmission and reception at the time of performing diversity. Therefore, this configuration is not applicable to the mobile terminal device in which an antenna with a higher reception level is selected and used from the two antennas. Moreover, the complex configuration makes it difficult to be applied to a wireless mobile terminal.

SUMMARY OF THE INVENTION

It is therefore an object of the present invention to provide a wireless terminal device with a simple configuration of a plurality of (two) antenna(s), a single receiver and a single reception level measuring section, which is capable of performing transmission and reception antenna diversity without a break of communication by the use of any one of various communication methods, for example, a W-CDMA method.

A wireless terminal device according to the present invention comprises a plurality of antennas, a radio section, a reception level measuring section, and a controller. The radio section receives radio waves from a base station via one of the antennas. The reception level measuring section measures a reception level of an antenna that is currently receiving radio waves. When a measured value of the reception level of the antenna currently receiving radio waves, the value being measured by the reception level measuring section, is equal to or less than a predetermined threshold value, or at regular time intervals, the controller generates a time period in which transmission and reception is temporarily interrupted without a break in data communication. Further in the time period, the controller switches from the antenna currently receiving radio waves to another antenna. Subsequently, the reception level measuring section measures a value of a reception level of the another antenna to compare the first measured value with the second measured value of the reception level of the another antenna. On the basis of the comparison, when the second measured value of the antenna is higher to some extent than the first measured value of the antenna that received radio waves before the switching, the controller switches to the antenna with the higher measured value.

As described above, by this configuration, the reception level measuring section measures a reception level of a radio wave from the base station. When the first measured value is equal to or less than the threshold value, or at regular time intervals, the transmission gap is generated in which the antenna currently receiving radio waves is switched to another antenna and the reception level of the another antenna is measured. Thereafter, the controller compares the two measured values and switches to the antenna that has a higher reception level to some extent. By this means, it becomes possible to perform transmission and reception antenna diversity without any adverse effects on the communication in a wireless terminal device employing a CDMA method.

BRIEF DESCRIPTION OF THE DRAWINGS

The objects and features of the present invention will become more apparent from the consideration of the following detailed description taken in conjunction with the accompanying drawings in which:

FIG. 7 is a perspective view schematically showing an external view of the wireless terminal device according to the embodiment of the present invention.

DESCRIPTION OF THE PREFERRED EMBODIMENT

Figure 1:
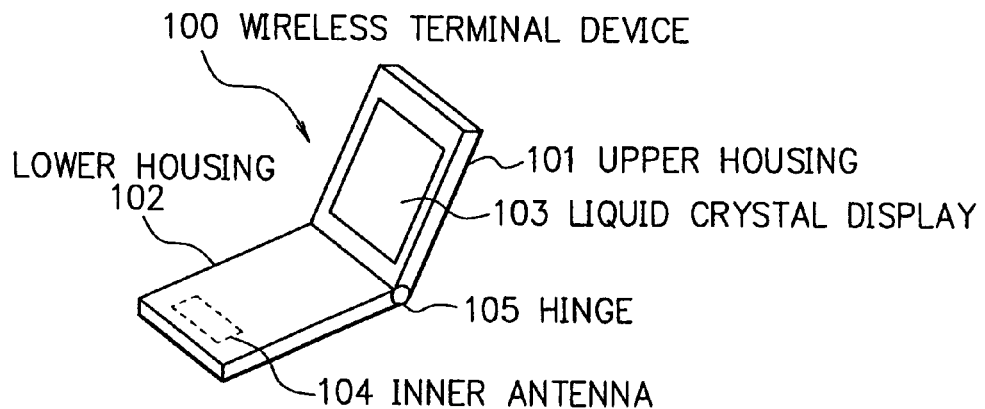
FIG. 1 is a perspective view schematically showing an external view of a conventional wireless terminal device.

Referring now to the drawings, an embodiment of the present invention is explained in detail.

Figure 5:
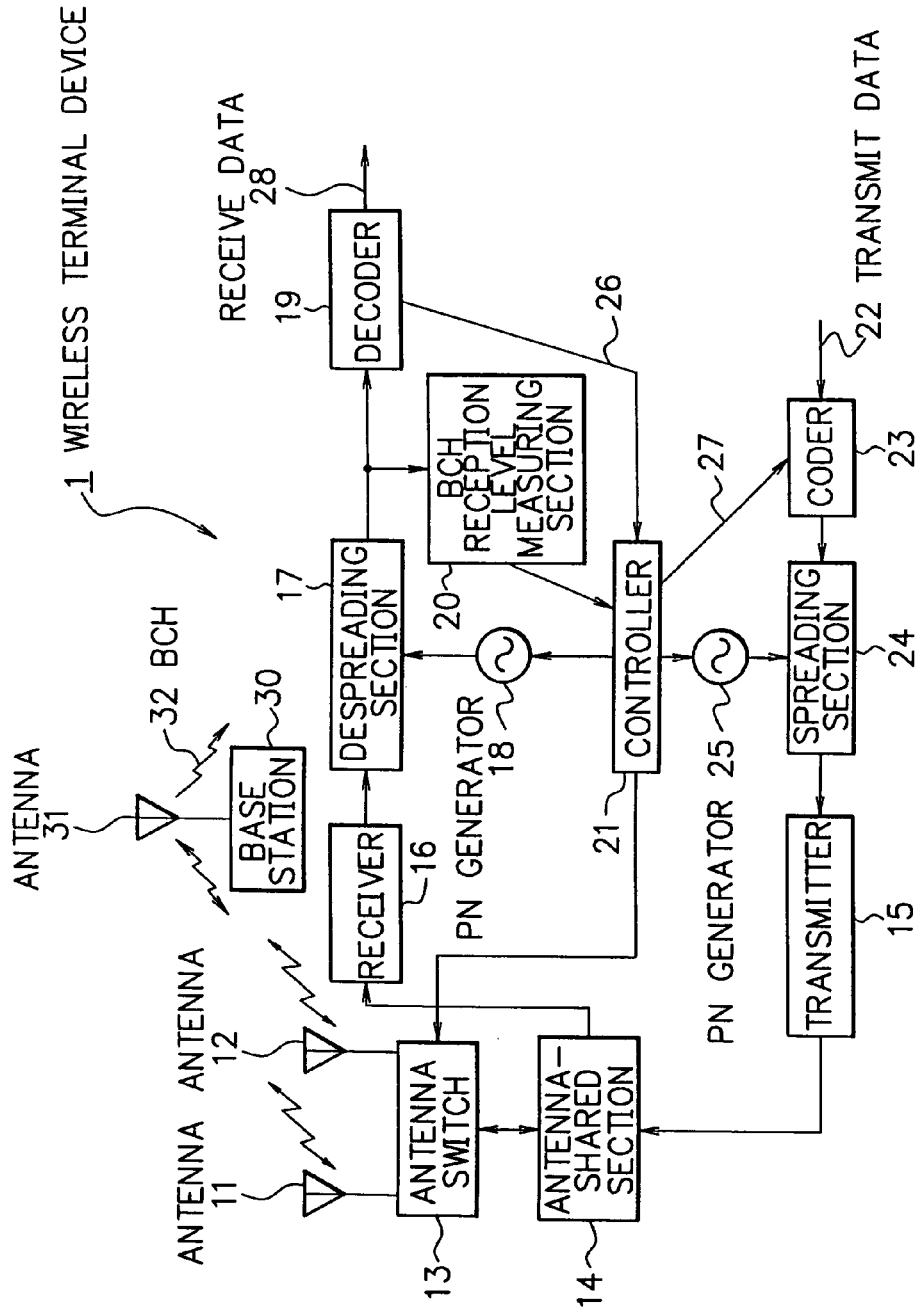
FIG. 5 is a block diagram showing a configuration of a wireless terminal device according to an embodiment of the present invention.

FIG. 5 shows a configuration of a wireless terminal device 1 according to an embodiment of the present invention.

The wireless terminal device 1 comprises antennas 11 and 12, an antenna switch 13, an antenna-shared device 14, a transmitter 15, a receiver 16, a despreading section 17, PN (Pseudorandom Noise) generators 18 and 25, a decoder 19, a BCH (Broadcast CHannel) reception level measuring section 20, a controller 21, a coder 23, and a spreading section 24. The transmitter 15 and the receiver 16 constitute a radio section.

The wireless terminal device 1 is allowed to communicate with a base station 30 provided with an antenna 31 by radio. Further, the base station 30 transmits broadcast information via a BCH (Broadcast CHannel) to the wireless terminal device 1. Examples of the broadcast information include system information, cell information and the like. The spreading section 24 performs spread spectrum with a spread code (PN code). The despreading section 17 performs despread spectrum with a spread code. The decoder 19 decodes output signals from the despreading section 17 to generate receive data 28. The coder 23 codes transmit data 22. There are two antennas 11 and 12 are shown in FIG. 5. Antenna 11 is currently used and antenna 12 is standby antenna. When the standby antenna 12 is a plural, the antenna switch 13 is connected antennas 11 and a plurality of antenna 12 (standby antennas), and is outputted to the antenna shared section 14 for outputting from the currently used antenna 11. The antenna switch 13 connects a plurality of antennas 11 and 12 (that is, connected antenna by the antenna switch 13 are 2 or more), and outputs to antenna shared section 14 from one antenna 11.

The PN generators 18 and 25 generate spread codes (PN codes) under the control of the controller 21, and supplies the generated PN codes to the despreading section 17 and the spreading section 24, respectively. The transmitter 15 is provided with a circuit for generating radio waves, for example, in the 800 MHz band, 1500 MHz band, and the like. The receiver 16 is provided with a circuit for receiving radio waves from the base station 30. The antenna-shared device 14 has either the antennas 11 or 12 shared for transmission and reception. The antenna switch 13 selects either the antenna 11 or the antenna 12 under the control of the controller 21.

The antennas 11 and 12 are connected to the antenna switch 13. The antenna switch 13 is connected to the antenna-shared device 14. The antenna-shared device 14 is connected to the transmitter 15 and the receiver 16. The receiver 16 is connected to the despreading section 17. The despreading section 17 is connected to the PN generator 18, the decoder 19, and the BCH reception level measuring section 20. The PN generator 18, the decoder 19, the BCH reception level measuring section 20 and the antenna switch 13 are connected to the controller 21. The PN generator 18 is located between the despreading section 17 and the controller 21. The controller 21 is connected to the coder 23. The coder 23 is connected to the spreading section 24. The spreading section 24 is connected to the transmitter 15. The PN generator 25 is located between the spreading section 24 and the controller 21.

For example, it is assumed that the wireless terminal device 1 is a mobile telephone employing a W-CDMA (Wideband-Coded Division Multiple Access) method based on 3GPP specifications (Third Generation Partnership Project: which is a project founded in 1998 for setting standards). In this embodiment, the wireless terminal device 1 utilizes, for example, a compressed mode of 3GPP. In the compressed mode, a transmission gap is generated to temporarily interrupt transmission and reception without breaking data communication. The compressed mode makes it possible to measure reception status of data (signals) in cells with different frequencies to perform different-frequency handover. To be concrete, first, the working antenna is switched to the other antenna (another antenna in the case of three or more antennas) utilizing the transmission gap, namely, the time period in which the transmission and reception is suspended to measure the reception level of the other antenna. Subsequently, the reception level of the working antenna is compared with the measured value of the other antenna, and an antenna with higher reception level is used after the transmission gap. By this means, it becomes possible to perform transmission and reception antenna diversity in the CDMA method without a break of communication such as telephone call. While there are several methods of realizing the compressed mode, the wireless terminal device according to the embodiment employs a method of converting a value of a spreading factor.

Figure 6:
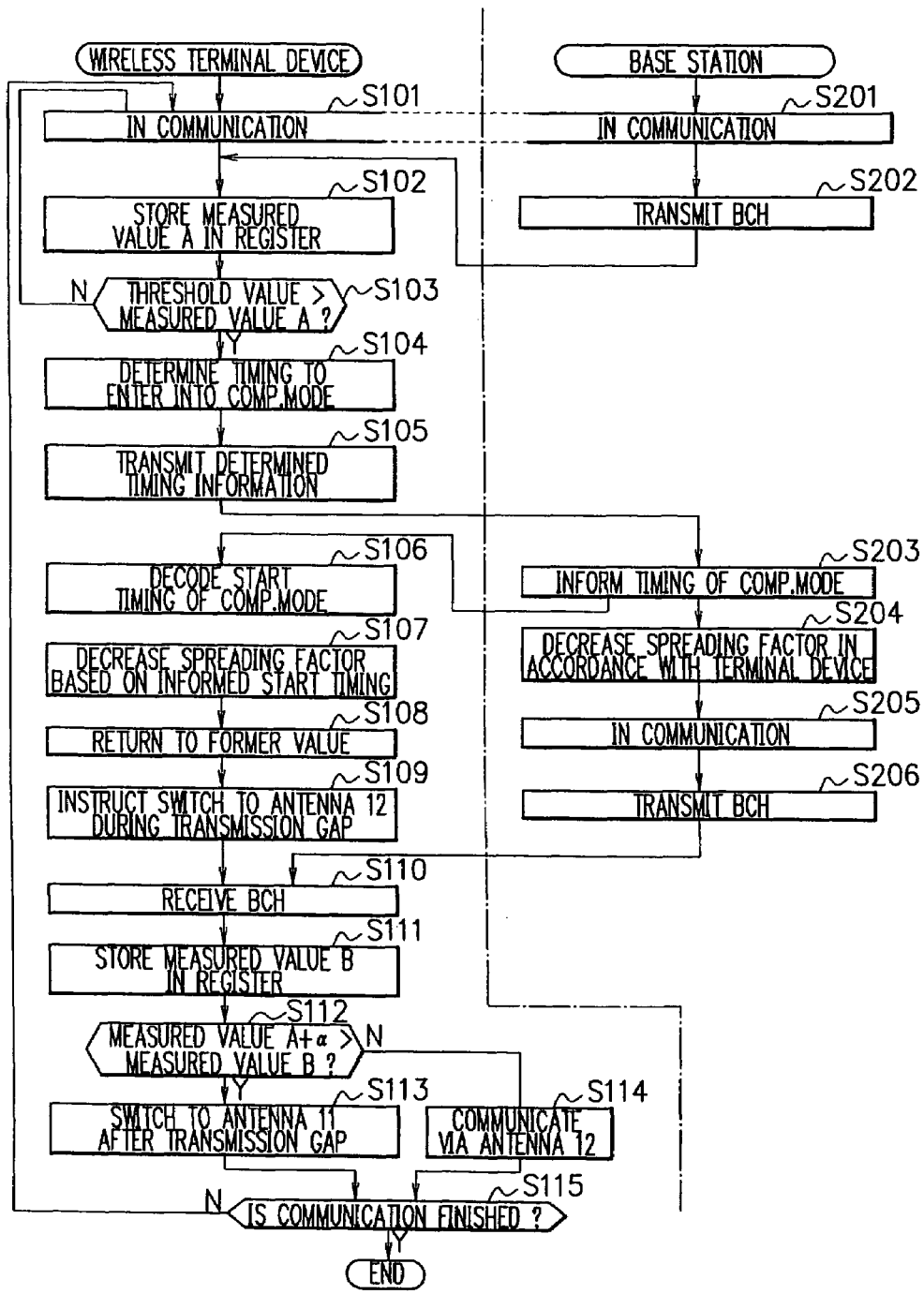
FIG. 6 is a flowchart showing processes between the wireless terminal device and a base station shown in FIG. 5.

FIG. 6 shows processes performed between the wireless terminal device 1 and the base station 30 shown in FIG. 5.

The wireless terminal device 1 and the base station 30 are in a state of communication via the antenna 11 (Steps S101 and 201). The base station 30 transmits broadcast information at a predetermined power through the BCH 32 (Step S202). When the wireless terminal device 1 receives the broadcast information of the BCH 32 during the communication, the reception level measuring section 20 measures the reception level of the broadcast information, and stores it as a measured value A in a register in the controller 21 (Step S102). Subsequently, the controller 21 compares the measured value A with a predetermined threshold value (Step S103). As a result of the comparison, when the predetermined threshold value is higher than the measured value A, that is, the measured value A is equal to or less than the threshold value (Step S103/Y), the processes are followed by Step S104. Otherwise (Step S103/N), the procedure goes back to Step S101.

When it is determined that [Threshold value>measured value A] (Step S103/Y), the controller 21 determines the timing of shifting the wireless terminal device 1 to the compressed mode (Step S104). Subsequently, the controller 21 transmits information about the timing to the coder 23 for coding. The coded information is transmitted to the base station 30 via the spreading section 24, the transmitter 15 and the antenna 11 (Step S105). When receiving the information from the wireless terminal device 1, the base station 30 adds timing information, which is information for informing the device 1 of the timing of starting the compressed mode, to data transmitted to the wireless terminal device 1, and transmits the timing information with the data to the device 1 (Step S203).

In the wireless terminal device 1, the receiver 16 and the despreading section 17 processes the receive data from the base station 30. Further, the decoder 19 decodes the timing information in the receive data (Step S106). On the basis of the decoded result, the controller 21 is informed of the timing of starting the compressed mode. The controller 21 performs control of increasing a data rate of transmission at the timing informed from the base station 30 and issuing instructions to the PN generators 18 and 25 to keep the same chip rates, respectively, so as to decrease the respective spreading factors (Step S107). Simultaneously, the base station 30 increases the data rate and conforms the spreading factors for transmission and reception waves to those used in the wireless terminal device 1 (namely, changes the values of the spreading factors to the values identical to those used in the device 1) (Step S204). By this means, the whole data can be transmitted and received faster in proportion to the increased ratio of the data rate, and thereby the transmission gap is generated. Incidentally, the transmission gap is composed of n-th frames and slots formed between the n-th frames, and data is not transmitted and received during the slots.

In the wireless terminal device 1, the controller 21 issues instructions to the PN generators 18 and 25 to returns the decreased spreading factors to the former value, respectively (namely, increases the decreased spreading factors up to the former values) (Step S108). Further, the controller 21 issues instructions to the antenna switch 13 to switch the antenna 11 to the antenna 12 during the transmission gap (Step S109). Subsequently, the wireless terminal device 1 receives the broadcast information through the BCH 32 from the base station 30 via the antenna 12 (Step S110). Thereafter, the BCH reception level measuring section 20 measures the reception level of the BCH 32 at the time of using the antenna 12, and stores it as a measured value B in the register (Step S111). Subsequently, the controller 21 compares the measured value B with the measured value A stored in the register at Step S102 (Step S112).

In this comparison of S112, when the measured value A is higher than the measured value B to some extent, namely, it is determined [Measured value A+α>Measured value B] (Step S112/Y), the controller 21 controls the antenna switch 13 to switch the antenna 12 to the antenna 11 after the transmission gap has finished (Step S113). Incidentally, the value α can be arbitrarily determined by a designer (α includes 0). On the other hand, when the measured value A is equal to or less than the measured value B (Step S112/N), the controller 21 does not issue instructions to the antenna switch 13 for switching and proceeds with the communication with the base station 30 as the antenna 12 is still connected and used (Step S114). Subsequently, the wireless terminal device 1 determines whether or not there occurs disconnection of communication (for example, the telephone call is finished) (Step S115). When the communication is still continued (Step S115/N), the procedure goes back to Step S101. On the other hand, when the finish of the communication is confirmed (Step S115/Y), the communication is ended.

Figure 2:
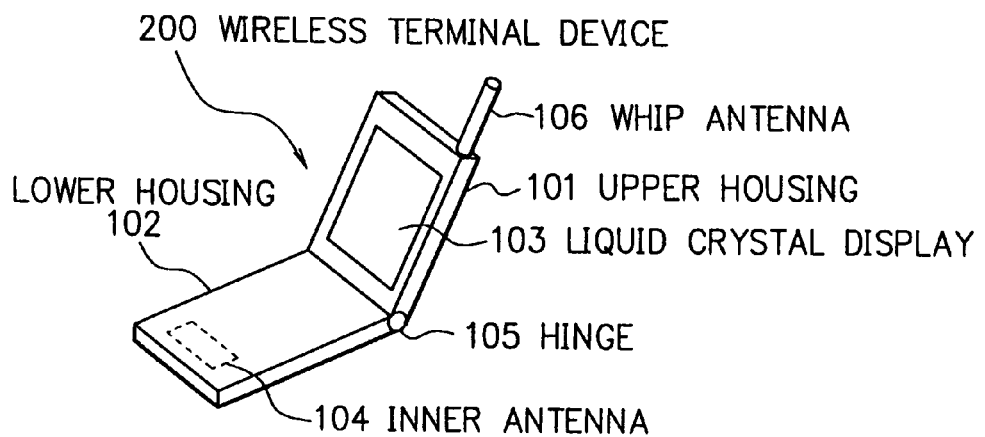
FIG. 2 is a perspective view schematically showing an external view of a conventional wireless terminal device provided with two antennas.
Figure 3:
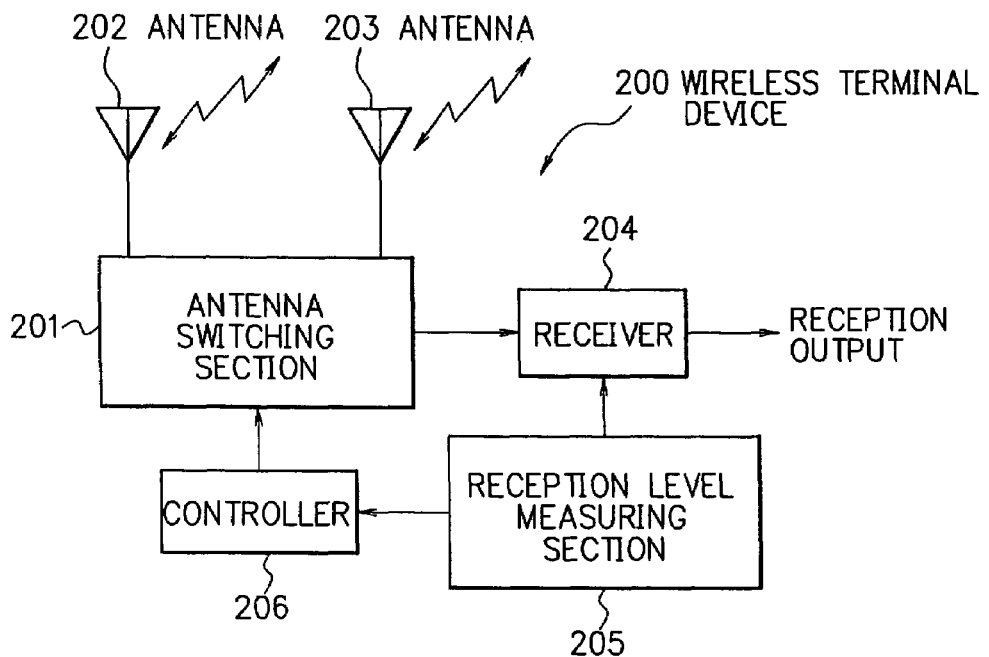
FIG. 3 is a block diagram showing a configuration of a general antenna diversity receiving section of a wireless terminal device employing a TDMA method.
Figure 4:
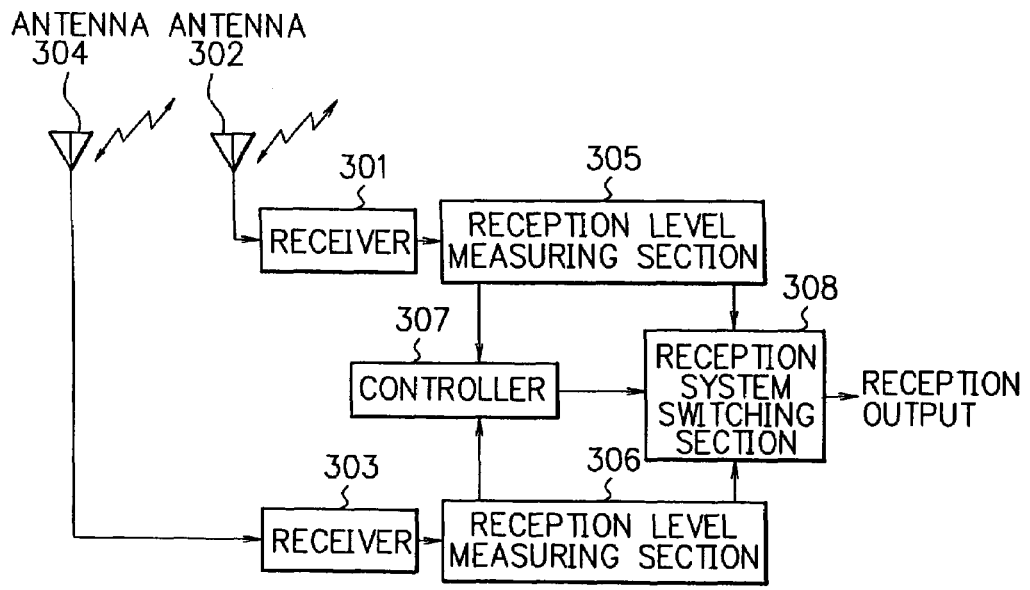
FIG. 4 is a block diagram showing a configuration of a wireless terminal device employing a CDMA method.

FIG. 7 is an external view of the wireless terminal device 1 according to the embodiment of the present invention. In FIG. 7, the same reference numerals as those in FIG. 2 denote the same parts. In this embodiment, the wireless terminal device 1 is a flip-type mobile terminal device. The wireless terminal device 1 comprises an upper housing 101, a lower housing 102 and a hinge 105. The upper housing 101 is provided with a liquid crystal display 103. The lower housing 102 is provided with a numeric keypad and function switches (not shown) for operation. The hinge 105 can be folded up so that the angle formed by the upper housing 101 and the lower housing 102 becomes approximate 0-180 degrees around the hinge 105. The lower housing 102 further includes an inner antenna 11. Further, the upper housing 101 is provided with a whip antenna 12 at one of the corners.

In FIG. 7, it is assumed that the wireless terminal device 1 is in use, that the inner antenna 11 is selected at the start of communication, and that a user uses the device 1 holding the lower housing 102 by his/her hand. In this situation, since the user holds the lower housing 102 provided with the inner antenna 11, the reception level of the antenna 11 is decreased and the reception level of the BCH 32 is also decreased. On the other hand, when the antenna 12 is selected, the area surrounding the upper housing 102 is a space (not covered by anything). Accordingly, the reception level of the BCH 32 is not deteriorated. As described above, the antenna covered by a hand has a lower reception level than the antenna not covered by a hand although there exists variation in sensitivity according to the type of the antennas. Therefore, it is conceivable that the reception level of the antenna 12 is increased when the antenna 11 is covered by a hand. Consequently, as explained at Step S109 in FIG. 6, the controller 21 and the antenna switch 13 are activated to switch the antenna 11 to the antenna 12. By switching the antennas, it becomes possible to perform communication with high quality.

On the other hand, it is assumed that the user changes the holding point from the lower housing 102 to the upper housing 101 during the communication via the antenna 12. In this context, if the antenna 12 approaches a steel frame of a building during the communication on a walk or the antenna 12 is located between two people, the reception level of the antenna 12 may become lower than that of the antenna 11. In this case, the measured values A and B, which indicate the reception levels of the BCH 32 received by the antennas 11 and 12, respectively, is compared as explained at Step S110 to S114 in FIG. 6. When the reception level of the antenna 11 is higher than that of the antenna 12, the working antenna is switched from the antenna 12 to the antenna 11. By this means, it becomes possible to obtain better communication quality.

Incidentally, while in the above embodiment the wireless terminal device 1 is provided with two antennas, it is also possible to use three or more antennas. Moreover, while in the above embodiment a mobile terminal telephone is employed as an example of the wireless terminal device 1, the present invention is not limited to the mobile telephone and applicable to various mobile electronics devices allowed to perform communication via public radio communication network, for example, PHS (Personal Handyphone System) and PDA (Personal Digital Assistant). Incidentally, while in the above embodiment the flip-type mobile terminal is employed as an example of the mobile terminal device 1, the present invention is applicable to the other types of mobile phones, such as a straight-type mobile phone. Moreover, the present invention is applicable to any other types of mobile devices.

Moreover, in the above-described embodiment, a reception level of a specified channel is measured by switching antennas during a transmission gap generated in the compressed mode. However, the period for switching is not limited to the transmission gap in the compressed mode. Namely, any time period in which transmission and reception is temporarily interrupted while data communication continues may be used for antenna switching and measurement of reception levels. When the standby antennas (antennas other than the transmitting/receiving antenna) are 2 or more, in one period of the compressed mode, reception level measurement(s) of the antennas are executed dependently (by one measuring at the period) or continuously in period(s).

Further in the above embodiment, a first measured value is compared with a threshold value at Step S103 in FIG. 6. Thereafter, when it is determined that [Threshold value> (first) Measured value], comparison of the reception levels between a working antenna and the other antenna is performed at Step S112. However, Step S112 may be performed at regular time intervals without the comparison of Step S103. To starting the Step S102 or Step S103 may be executed to direct or command by the wireless terminal (controller 21) or by the base station 32.

Moreover in the above-described embodiment, the BCH reception level measuring section 20 measures a reception level of a specified channel (namely, the BCH). However, the measuring object in the present invention is not limited to the measurement of a specified channel. Namely, the section 20 may measure a reception level of information such as RSSI (Received Signal Strength Indicator), RSCP (Received Signal Code Power), BER (Bit Error Rate) or BLER (Block Error Rate), or a physical channel such as RSCP (Received Signal Code Power) or Ec/N or the like. In the present invention, the section 20 may use one or may use combination of two or more above-mentioned information as the threshold value. When the reception level is a plurality of the information, the present invention may use sum of product of information and the information weight based on importance of communication system as the threshold value. For example, if RSSI and BER are selected for comparing and as measurement information, and weights of the RSSI and BER defines $W_R$ and $W_B$, respectively, a reception level of the using antenna 11 is:

$$RL_{11}=RSSI_{11} \cdot W_R+BER_{11} \cdot W_B \qquad (F1)$$

And a reception level of the compared antenna 12 is:

$$RL_{12}=RSSI_{12} \cdot W_R+BER_{12} \cdot W_B \qquad (F2)$$

In above formulas, the values $RSSI_{11}$, $BER_{11}$, $RSSI_{12}$ and $BER_{12}$ are measured RSSI value and BER value of antenna 11, and antenna 12, respectively. In the Step S112, in replacing measured value A and B, $RL_{11}$ and $RL_{12}$ values are compared. The compared antennas 12 are 2 or more, then the controller 21 may select the antenna from the standby antennas in same formulation.

Furthermore in the above-described embodiment, the compressed mode based on the 3GPP specifications of W-CDMA method is used to generate a period for temporarily disconnecting transmission and reception. However, the period for temporary interruption may be generated on the basis of another communication method. The present invention is also applicable to a wireless terminal device employing a communication method that requires continuous transmission and reception during communication. Examples of these kinds of communication methods (systems) include a CDMA method, a DS(Direct Spread)-CDMA method, which is one of the W-CDMA methods, MC(Multi Carrier)-CDMA (or cdma2000) method, and a PHS method. In this case, the same effects as those obtained by the above-described embodiment can be obtained.

As set forth hereinbefore, the wireless terminal device according to the present invention measures at a reception level measuring section a reception level of a radio wave from a base station. When the measured value is equal to or lower than a threshold value or after a predetermined period of time has passed, the wireless terminal device compares at the controller the two reception levels of a working antenna and the other antenna, the levels being measured by the reception level measuring section, are compared. Subsequently, the antenna is switched to an antenna with a higher reception level during a time period in which transmission and reception is temporarily stopped without a break of data communication. Accordingly, it becomes possible for a wireless terminal device employing a communication method such as W-CDMA, CDMA, DS-CDMA, MC-CDMA, PHS to perform transmission and reception antenna diversity without any adverse effects on the communication.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A wireless terminal device, comprising:
    a plurality of antennas;
    a radio section for receiving radio waves from a base station via one of the antennas;
    a reception level measuring section for measuring a reception level of the antennas including an antenna that is currently receiving and/or transmitting radio waves; and
    a controller:
    wherein the controller temporarily interrupts transmission and reception for a period of time without disconnection in data communication,
    the reception level measuring section measures at least one of the antennas' reception level except the receiving and/or transmitting antenna in the period of time, and
    the controller switches antennas when the reception level of the receiving and/or transmitting antenna is equal to or less than the reception level measured in the period of time.

2. A wireless terminal device as claimed in claim 1, wherein:
    the reception level measuring section receives data in a certain channel from the base station.

3. A wireless terminal device as claimed in claim 2, wherein:
    the certain channel is a broadcast channel.

4. A wireless terminal device as claimed in claim 1, wherein:
    the reception level measuring section measures a reception level of information about received signal strength indicator transmitted from the base station.

5. A wireless terminal device as claimed in claim 1, wherein:
    the plurality of antennas include at least an inner antenna set in a housing of the wireless terminal device and a linear antenna a part of which is extensible from the housing.

6. A wireless terminal device as clamed in claim 1, wherein:
    the time period in which transmission and reception is temporarily interrupted occurs when performing communication by a communication method that requires continuous transmission and reception during communication.

7. A wireless terminal device as claimed in claim 1, wherein:
    the time period in which transmission and reception is temporarily interrupted occurs when performing a compressed mode based on third generation partnership project specifications of a W-CDMA method.

8. A wireless terminal device as claimed in claim 7, further comprising:
    a spreading section; and
    a despreading section, wherein:
    when being informed of a timing of shifting to the compressed mode, the controller changes respective spreading factors for the spreading section and the despreading section so as to increase respective transmission data rates to form the period in which transmission and reception is temporarily interrupted, and returns the changed spreading factors to the former values after the time period is finished.

* * * * *